UNITED STATES PATENT OFFICE.

EARL J. RUEB, OF OKLAHOMA, OKLAHOMA, ASSIGNOR TO O. K. ELECTRIC STORAGE BATTERY COMPANY, OF OKLAHOMA, OKLAHOMA, A CORPORATION OF OKLAHOMA.

STORAGE-BATTERY ELECTRODE AND PROCESS OF MAKING SAME.

1,291,167.  Specification of Letters Patent.  Patented Jan. 14, 1919.

No Drawing.  Application filed July 24, 1917. Serial No. 182,592.

*To all whom it may concern:*

Be it known that I, EARL J. RUEB, a citizen of the United States, residing at Oklahoma, in the county of Oklahoma and State of Oklahoma, have invented a new and useful Storage-Battery Electrode and Process of Making the Same, of which the following is a specification.

This invention has reference to storage battery electrodes and to the process of making electrodes whether positive or negative, and its object is to provide an electrode which will not chip, crumble, flake or similarly deteriorate under conditions of use or non-use and which will not sulfate, and which will furthermore withstand heavy charging and discharging.

In preparing the electrodes, yellow lead or litharge is used for the negative electrode, and red lead is used for the positive electrode. A paste is made of the chosen lead oxid with glycerin, aluminum sulfate and sulfuric acid of about 1.400 specific gravity. By way of example, it may be stated that for the amount of paste needed for eighteen plates, 4x5½ inches, about three ounces of glycerin will be needed and one and one-half ounces of aluminum sulfate, the quantity of acid being sufficient to make the ingredients into a paste of the requisite stiffness to hold its place in a suitable lead grid while being subjected to further treatment.

After the grids have been filled with the paste, they are stacked up in a pile with separators between them and with a vessel containing an electrolyte beneath the stack, and the plates and electrolyte are subjected to heat in an oven or chamber for a suitable length of time, say about one and one-half hours, the degree of heat being near to but sufficiently below the melting point of lead to avoid any danger to the lead grids.

The electrolyte is made up of sulfuric acid of about 1.150 specific gravity, aluminum sulfate and ferric chlorid in the proportions of about one gallon of acid, one and one-half ounces of aluminum sulfate and one ounce of ferric chlorid, these proportions being susceptible of some change.

The result is that the baking of the plates takes place in an atmosphere of the electrolyte so that there is infiltration of the paste or active material of the electrode by the volatilized materials of the electrolyte all during the baking procedure.

After the baking is completed, whereby the pasty material of the electrodes become hardened, the electrodes are tempered by being dipped repeatedly in a bath of the electrolyte and are finally washed in water.

The plates are then properly assembled in a suitable cell and subjected to a charging current which, for the size of plates hereinbefore mentioned, may be about three and one-half amperes. After the first charging, the battery is discharged and then recharged at, say, about five and one-half amperes. It is again discharged and recharged at about the same rate and once more discharged after which it is subjected to a final charge which may run as high as twenty amperes or even more for the size plates hereinbefore described. The battery is then ready for ordinary use.

A complete battery, whether consisting of one cell or two or more cells, is smaller in dimensions and lighter in weight than other storage batteries of the same output.

The electrodes and electrolyte may be placed in a wooden cell or casing impregnated with oil or paraffin, since it has been found from actual experience that the electrolyte has no deleterious effect upon wood and especially upon wood which has been protected by some substance repellent of water such as oil or paraffin. Moreover, the electrolyte will not affect substances which would be destroyed or seriously injured by the electrolytes commonly employed in storage batteries.

Experience has shown that the electrolyte does not heat materially even under heavy charges, it having been found that in the case of a charge of current of twenty or more amperes in a cell containing plates of the size hereinbefore mentioned, no sensible heating occurs.

The battery prepared in the manner described has the advantage of being free from sulfating, may be short circuited without harm and even if the short circuit be continued until the battery is practically dead, it will recuperate to a considerable extent and may be further used, although at a lower voltage than when fully charged.

The battery has the advantage of being practically free from gassing, so that there is no danger at any time of the accumulation of gas and attendant danger of explosion, which has been found to occur with various types of commercial storage batteries.

The plates or electrodes are practically free from liability of flaking, crumbling or buckling, and hence are correspondingly free from faults prevalent in storage batteries.

In the assembled battery, sheets of cardboard or strawboard or similar material impregnated with oil or some other similar substance have been found efficient as separators, permitting very close approach of the plates, and, as the plates do not buckle or swell, such cardboard separators are found to completely answer the purpose. Also because the plates do not buckle or swell or flake or crumble, it is possible to employ simple strips as separators. The cardboard separators, however, are preferred.

When the plates are first baked the paste filler of the grids is hard and compact and becomes harder each time the battery is charged and discharged.

Various advantages ascribed to the battery are based upon actual experience through trials extending over a protracted period.

Experience has shown that the glycerin employed tends to harden the plates, the iron chlorid prevents gassing and bubbling, and the aluminum sulfate appears to reduce the internal resistance, since the output of the battery is considerably reduced when the aluminum sulfate is omitted.

Tests have demonstrated that the output of the battery may reach about one ampere per square inch of electrode surface on maximum discharge and this without harm to the electrodes.

It has been found from actual test that the electrolyte holds up under long use and many rechargings, requiring only the addition of water which latter need not be distilled water. The additional water is only necessary to replace the water lost by evaporation or from other causes, so that the electrodes may remain covered with the electrolyte.

What is claimed is:—

1. The process of preparing electrodes for storage batteries, which consists in providing the electrodes with active material in paste form, and then baking the active material in the electrode in an atmosphere of the electrolyte to be used in the completed battery.

2. The process of preparing electrodes for storage batteries, which consists in providing the electrodes with active material in paste form and composed of an oxid of lead and constituents of the electrolyte to be used in the completed battery, and then baking the active material in the electrode in an atmosphere of the electrolyte.

3. The process of preparing electrodes for storage batteries, which consists in providing a stiff paste composed of an oxid of lead, glycerin, aluminum sulfate and sulfuric acid, applying the paste to a lead grid, and then baking the electrode while in an atmosphere of the electrolyte to be used in the finished battery.

4. The process of preparing electrodes for storage batteries, which consists in preparing a stiff paste composed of an oxid of lead, glycerin, aluminum sulfate and sulfuric acid, applying the paste to a lead grid, and then baking the electrode while in an atmosphere of the electrolyte to be used in the finished battery, said electrolyte comprising glycerin, aluminum sulfate, sulfuric acid and ferric chlorid.

5. The process of preparing electrodes for storage batteries, which consists in applying to an electrode support a pasty mass of active material composed of oxid of lead, glycerin, aluminum sulfate and sulfuric acid of substantially 1.400 specific gravity, and then baking the electrode in an atmosphere of the electrolyte to be used in the finished battery.

6. The process of preparing electrodes for storage batteries, which consists in applying to an electrode support a pasty mass of active material composed of oxid of lead, glycerin, aluminum sulfate and sulfuric acid of substantially 1.400 specific gravity, and then baking the electrode in an atmosphere of the electrolyte to be used in the finished battery, said electrolyte being composed of glycerin, aluminum sulfate, sulfuric acid of substantially 1.150 specific gravity, and ferric chlorid.

7. The process of preparing electrodes for storage batteries, which consists in providing electrode supports with active material in paste form, with the active material mixed with constituents of the electrolyte to be used in the completed battery, baking the electrodes in an atmosphere of the electrolyte, curing the electrodes by repeatedly dipping them in a bath of the electrolyte and finally washing them with water, and then finishing the electrodes by repeatedly charging and discharging them.

In testimony, that I claim the foregoing as my own, I have hereto affixed my signature in the presence of two witnesses.

EARL J. RUEB.

Witnesses:
INEZ FROST,
E. E. GIBBENS, Jr.